United States Patent Office 2,751,348
Patented June 19, 1956

2,751,348

COMPOSITION FOR ACIDIZING WELLS

Harold W. Brainerd, Jr., Tulsa, Okla., assignor to Stanolind Oil and Gas Company, Tulsa, Okla., a corporation of Delaware No Drawing. Application April 9, 1953,
Serial No. 347,828

10 Claims. (Cl. 252—8.55)

This application relates to the acidizing of formations, especially oil-producing formations, penetrated by a well. More particularly, this invention pertains to an improved composition for fracturing and acidizing calcareous oil-producing formations.

In the treatment of an oil-producing formation to increase productivity, acid has often been injected into the formation to enlarge the pores. That process has recently been improved by incorporating in the acid various gelling or emulsifying agents which increase the viscosity or decrease the filtrate rate of the acid so that it does not readily penetrate the pores of the formation when the gelled acid is injected into a well. This gelled acid can be injected into a formation only by the application of a very high pressure which fractures the formation and displaces the gelled acid back through the resulting fracture a great distance into the formation, thus displacing the acid a substantial distance away from the well, where it reacts upon the calcareous material in the formation and enlarges the flow channels. In a copending application, S. N. 221,136, filed April 14, 1951, in the name of H. W. Brainerd, Jr., C. R. Fast, and G. C. Howard, now Patent No. 2,689,009, dated September 14, 1954, an improved method and composition for gelling acid solutions and injecting these solutions into a well have been disclosed. In that case, the acid is rendered viscous or gelled by emulsification with an oily vehicle containing Batu gum. It was shown, for example, that in a composition containing 100 parts hydrochloric acid, 12 parts kerosene, and 2 parts Batu gum by weight, an emulsion having between 32 and 37 poises, as measured on a Stormer viscosimeter at 600 R. P. M., could be produced depending upon the fineness of grind of the gum—the viscosity varying inversely as the particle size of the gum. That method and composition have been used satisfactorily, but I have now found that the composition therein disclosed can be substantially improved, i. e., the viscosity can be increased, the filtrate rate reduced, and the amount of finely-divided solids which are incorporated in the emulsion and injected into a producing formation can be decreased. Viscosities reported herein are, as measured with a Stormer viscosimeter at 600 R. P. M., in accordance with A. P. I. Code 29. It is, therefore, an object of this invention to provide an improved composition for fracturing and acidizing formations penetrated by a well. It is a more specific object of this invention to provide an additive for mineral acid-hydrocarbon emulsions produced with Batu gum as heretofore used whereby the emulsion can be produced with a lower solids content. These and other objects of the invention will become apparent from the following description.

In brief, this invention comprises a fracturing and acidizing composition wherein an aqueous acid solution is made viscous or made to have a low filtrate rate by emulsification with a hydrocarbon liquid using Batu gum and a solvent for the gum. By combining a solvent for the Batu gum in the emulsion, it has been found that the amount of gum required to produce a stable emulsion of high viscosity and low filtrate rate can be reduced to a small per cent of the amount of gum required to produce a similar emulsion without such a solubilizing agent.

As disclosed in the above-mentioned copending case, any strong mineral acid solution such as hydrochloric, nitric, or hydrofluoric acid, i. e., any acid which reacts with the material in a formation and which produces a water-soluble salt can provide the base fluid for the present composition. Inasmuch as hydrochloric acid is customarily used for acidizing calcareous formations and is generally available in oil-producing areas, it is generally the preferred base acidizing fluid. The concentration of the hydrochloric acid may vary from about 5° to about 20° Bé. A concentration of about 10° Bé.—15 per cent hydrochloric acid is preferred.

The immiscible liquid with which the strong mineral acid is emulsified may consist of any nonaqueous liquid such as vegetable or mineral oils. Liquid petroleum hydrocarbons, e. g., crude oil, kerosene, diesel fuel, or other light liquid aliphatic hydrocarbons of this class are typical. In view of its wide availabilty and substantially uniform composition, kerosene is the preferred hydrocarbon liquid.

The emulsifying agent, Batu gum, is a natural resin, related to the Damar natural resins, which is a secretion or exudation of the Shorea tree of the East Indies. This gum is insoluble in water, soluble in aryl or coal tar hydrocarbons and is hydrogenated aliphatic petroleum solvents, but is generally only very sligthly soluble in crude petroleum or refined paraffinic petroleum hydrocarbons. It is, however, compatible with and can be dispersed in paraffinic hydrocarbons, both crude and refined. It is available commercially in classes designated as bold scraped, unscraped, nubs and chips, and as dust. Any of these commercially-available forms produce satisfactory emulsification of the acid and hydrocarbon phases, providing the particles are suitably ground. In order that the gum may dissolve or disperse readily in the hydrocarbon phase, it is generally ground to pass through a 100-mesh U. S. standard sieve or finer. Particles of even smaller size are preferred inasmuch as the viscosity of the emulsion has been found to increase as the particle size of the gum is decreased. Grinding to a particle size of less than about 325-mesh sieve is desired.

The Batu gum solvent used to disperse the gum in the hydrocarbon phase may comprise any material which dissolves the gum or tends to solubilize it in the hydrocarbon phase. The aryl and coal tar hydrocarbons are examples. Since heat is sometimes required with these solvents, the saturated, inert, water-soluble, cyclic mono- or diethers having 3 to 4 carbon atoms in a 5 to 6 member ring are more desirable. Examples of such ethers are tetramethylene oxide (tetrahydrofuran); trimethylene glycol methylene ether, 1,3-dioxane (m-dioxane); glycol ethylene ether, 1,4-dioxane (p-dioxane); ethylene glycol methylene ether, (1,3-dioxolane); 1,3,5-trioxane (sym-trioxane); and diethylenimide oxide (morpholine). All of these solvents are characterized by substantially infinite solubility in water, alcohol, and diethyl ether.

The emulsion is prepared by first mixing with the hydrocarbon phase between about 5 and about 15 parts of the solvent per 100 parts by weight of the hydrocarbon. Typically, about 8 parts ether solvent per 100 parts kerosene are used. After the ether solvent has been dissolved in the kerosene, between about 2 and about 6 parts of the finely-divided Batu gum per 100 parts by weight of liquid hydrocarbon are mixed into the hydrocarbon-ether solution. About 4 parts of Batu gum per 100 parts by weight of kerosene are preferred. The gum disperses in the hydrocarbon within a few minutes. This hydrocarbon liquid containing the emulsifying agent and the solvent is then mixed, preferably at a high shear rate, with the acid solution. The ratio of the nonaqueous phase to the acid solution may be varied over a substantial range. It is highly desirable, however, that the acid solution predominate in the emulsion inasmuch as the acid solution is the effective solvent for the formation or deposit of which is being fractured. A small proportion of the hydrocarbon phase, typically between about 10 and about 15 parts per 100 parts by weight of the acid solution, is used. In the preferred embodiment about 3 barrels of hydrocarbon (126 gallons) are emulsified with about 1,000 gallons of 20 per cent hydrochloric acid solution.

The two phases may be emulsified by any number of means. A homogenizer is preferred. The viscosity of the emulsion depends somewhat upon the method used to produce the emulsion. Using even the very small concentrations of Batu gum, as above stated, it has been found that a viscosity as high as 50 poises may be obtained even when the two phases are emulsified with an ordinary reciprocating pump. Higher viscosities can be obtained using jet-type homogenizers and the like. Generally, a viscosity in the range of a few hundred to five thousand centipoises, as measured on the Stormer viscosimeter at 600 R. P. M., is considered sufficient to fracture most formations. A liquid having a viscosity as low as 30 centipoises or having a filtrate rate of less than about 100 cubic centimeters per 30 minutes in the standard A. P. I. filtrate rate test is also considered desirable.

A fracturing gel prepared from 100 parts of 15 per cent hydrochloric acid solution, 12 parts kerosene, and 2 parts Batu gum, without special solvents, had a viscosity, as measured on a Stormer viscosimeter at 600 R. P. M., after mixing for 30 minutes with a high speed mixer of between 32 and 37 poises, depending upon the fineness of the grind. Viscosities are as measured on a Stormer viscosimeter at 600 R. P. M. Specifically, with 200 mesh Batu nubs and chips a viscosity of 34 poises was obtained. By comparison and as an example of the effect of a gum solvent, using the same amount and concentration of hydrochloric acid solution and kerosene, the same emulsifying technique, and using only 1 part by weight of p-dioxane, a 50 poise emulsion was prepared with only 0.5 part of the same gum.

In another example, 1.075 parts by weight of Batu gum were dispersed in 60 parts kerosene using 5.83 parts of morpholine, and 400 parts of 15 per cent hydrochloric acid were then emulsified in this hydrocarbon phase using rapid agitation. The emulsion formed within about 2 minutes, and after about 10 minutes of rapid mixing, the viscosity of the emulsion on a Gardner mobilimeter measured 1500 centipoises. The fluid loss of the emulsion using the standard A. P. I. filtrate rate apparatus described in Code 29 measured 85 cubic centimeters in 30 minutes. For comparison the viscosity of the emulsion on a Stormer viscosimeter at 600 R. P. M. measured 335 centipoises. A similar test was then conducted wherein no solvent was used. In this test 4.3 parts by weight of the Batu gum (four times the amount of Batu gum previously used) were dispersed in 60 parts of kerosene and 400 parts of 15 per cent hydrochloric acid were then emulsified in this Batu gum-kerosene mixture. The viscosity of the emulsion thus produced measured only 850 centipoises on the Gardner mobilimeter and 230 centipoises on the Stormer viscosimeter. The A. P. I. fluid loss at 100 p. s. i. for 30 minutes was 38 cubic centimeters. A similar test was then conducted without a solvent wherein the amount of Batu gum was reduced to that used in the morpholine test described above. Again 1,075 parts of Batu gum were dispersed in 60 parts of kerosene, and 400 parts of 15 per cent hydrochloric acid were then emulsified in this Batu gum-kerosene mixture without the use of a solvent. The viscosity on the Stormer viscosimeter at 600 R. P. M. measured 122 centipoises. This emulsion was too thin to measure on a Gardner mobilimeter. The A. P. I. fluid loss using the standard procedure was 166 cubic centimeters in 30 minutes.

For comparison, a test similar to that described above but using a different solvent, namely toluene, was then conducted. In this case, 11.66 parts of toluene and 60 parts of kerosene were mixed together, and 1.075 parts by weight of Batu gum were dispersed therein by mixing for about 2 minutes. Then, 400 parts of 15 per cent hydrochloric acid were emulsified in this nonaqeous phase after the mixture had been heated to 115° F. The stable emulsion formed within less than about 10 minutes. The viscosity measured on a Stormer viscosimeter at 600 R. P. M. was 172 centipoises. The A. P. I. fluid loss using an acid resistant number 52, filter paper was 63 cubic centimeters in 30 minutes.

Thus, even when the amount of gum was reduced to only ¼ that required in the "nonsolvent" test, other things being equal, a substantial increase in viscosity was obtained by adding a small but effective amount of a gum solvent to the nonaqueous phase.

This gel or emulsion may be prepared at a central point and stored for long periods of time since the acid does not readily attack or destroy the emulsifying agent. In practice, the emulsion is, however, generally prepared at a central bulk station on the day it is used. This fracturing liquid is then transported in tank trucks or the like to the well site. High pressure, high capacity pumps displace the emulsion down into the well in accordance with the procedure described in U. S. Patent 2,596,843 to Farris. When it has been displaced back into the calcareous formation by the application of a pressure sufficient to fracture the formation, the emulsion is partially broken. The acid solution thus contacts and reacts with the calcareous material therein producing a water-soluble salt. This reaction of the acid with the formation appears to break the acid-in-oil emulsion and release substantially all of the acid for reaction with the formation. While it can readily be shown that the gel or emulsion breaks due to contact with a calcareous formation, the real cause of the reversion of the emulsion is not definitely known. The reaction products, the change in pH of the acid, or perhaps a combination of these and other elements may be the cause. The breakdown of the emulsion appears to be very rapid in the presence of a surplus of calcareous material. Within about two hours a 50 poise emulsion has been found to be reduced to a viscosity of a few centipoises, and within about 24 hours the emulsion is completely reduced so that its viscosity is about that of the respective base aqueous and nonaqueous phases. These components then being of about the same viscosity as the well fluids may be readily removed from the formation by producing liquids from the well.

It can be seen that by the use of a solvent, particularly the cyclic ethers, the amount of Batu gum required to produce a very viscous emulsion with an acid solution and a hydrocarbon liquid is reduced to a small percentage of the amount required where no such solvent is employed. This reduction in the solids content of the fracturing liquid is, of course, highly desirable inasmuch as the injection of colloidal solids into a formation has been shown to reduce the permeability of a formation. Accordingly, it can readily be seen that by incorporating a small but effective amount of liquid solvent in the acid-hydrocarbon gel produced with Batu gum, the resultant permeability of a fractured and acidized formation is materially increased. It can also readily be seen that this invention is susceptible of a wide variety of embodiments. For example, it will be apparent that various derivatives of the saturated, inert, water-soluble, cyclic ethers above described may be substituted for the preferred class and the examples given without departing from the spirit of the invention. A propping agent such as sand may also be incorporated in the emulsion. This invention should accordingly be construed to be limited only by the scope of the appended claims.

I claim:
1. A composition of matter comprising an acid-in-oil emulsion of a strong mineral acid solution and an aliphatic hydrocarbon liquid containing Batu gum and sufficient saturated, water-soluble cyclic ether to disperse said gum in said liquid.
2. A composition according to claim 1 wherein said saturated, water-soluble, cyclic ether is selected from the group consisting of mono- and diethers having from 3 to 4 carbon atoms in a 5 to 6 member ring.
3. A well-treating fluid comprising a finely-divided Batu gum dispersed in an aliphatic oily vehicle with a saturated, water-soluble, cyclic ether having 3 to 4 carbon atoms in a 5 to 6 member ring and an acid solution capable of forming a water-soluble salt from earth formations, said acid being emulsified as the discontinuous phase in said oily vehicle.
4. An acid-in-oil emulsion comprising 100 parts of said acid and between about 10 and about 15 parts by weight of an aliphatic liquid hydrocarbon, said hydrocarbon containing between about 0.5 and about 6 parts of finely-divided Batu gum and sufficient water-soluble cyclic ethers to disperse said Batu gum in said hydrocarbon and produce an emulsion having a viscosity greater than about 30 centipoises.
5. An acid-in-oil emulsion comprising by weight 100 parts of a mineral acid solution and between about 10 and about 15 parts of an aliphatic liquid hydrocarbon by weight, said liquid hydrocarbon containing between about 0.5 and about 6 per cent by weight of finely-divided Batu gum and between about 5 and about 15 per cent by weight of a solvent selected from the groups consisting of saturated, water-soluble, cyclic mono- and diethers having 3 to 4 carbon atoms in a 5 to 6 member ring.
6. An emulsion in accordance with claim 5 in which said solvent is trimethylene glycol methylene ether.
7. An emulsion in accordance with claim 5 in which said solvent is tetramethylene oxide.
8. An emulsion in accordance with claim 5 in which said solvent is glycol ethylene ether.
9. An emulsion in accordance with claim 5 in which said solvent is diethylenimide oxide.
10. An emulsion in accordance with claim 5 in which said solvent is ethylene glycol methylene ether.

References Cited in the file of this patent
UNITED STATES PATENTS

| | | |
|---|---|---|
| 2,038,720 | De Groote | Apr. 28, 1936 |
| 2,045,759 | De Groote | June 30, 1936 |
| 2,050,932 | De Groote | Aug. 11, 1936 |
| 2,596,137 | Fast | May 13, 1952 |